United States Patent [19]

Resjö et al.

[11] 4,322,826
[45] Mar. 30, 1982

[54] METHOD AND SYSTEM FOR DISTINGUISHING BETWEEN DISPLACING TARGETS AND A SURFACE OF WATER

[75] Inventors: Per-Arne Resjö, Blommedal; Hans P. Loid, Holmenbacken, both of Sweden

[73] Assignee: Forenade Fabriksverken, Eskilstuna, Sweden

[21] Appl. No.: 96,215

[22] Filed: Nov. 20, 1979

Related U.S. Application Data

[63] Continuation-in-part of Ser. No. 946,404, Sep. 27, 1978, abandoned.

Foreign Application Priority Data

Sep. 27, 1977 [SE] Sweden ............................ 7710781

[51] Int. Cl.³ .................... G01S 15/04; G01S 15/88
[52] U.S. Cl. ........................................ 367/96; 367/97
[58] Field of Search ................. 367/87, 93, 96, 97, 367/98

[56] References Cited

U.S. PATENT DOCUMENTS 3,380,018  4/1968  Littrell et al. ........................ 367/98
4,245,332  1/1981  Schaefer ............................... 367/98

*Primary Examiner*—Richard A. Farley
*Attorney, Agent, or Firm*—Fleit & Jacobson

[57] ABSTRACT

This invention relates to a method and system for distinguishing between displacing targets and a surface of water by transmitting pulses from a transmitter that is submerged in the water, the pulses being reflected and received by a receiver, also submerged in the water. The variations in the distance to the reflecting surface for consecutive pulses are measured and compared with a first value, determined inter alia from the state of the sea, and with another value, determined from the size of the target.

3 Claims, 3 Drawing Figures

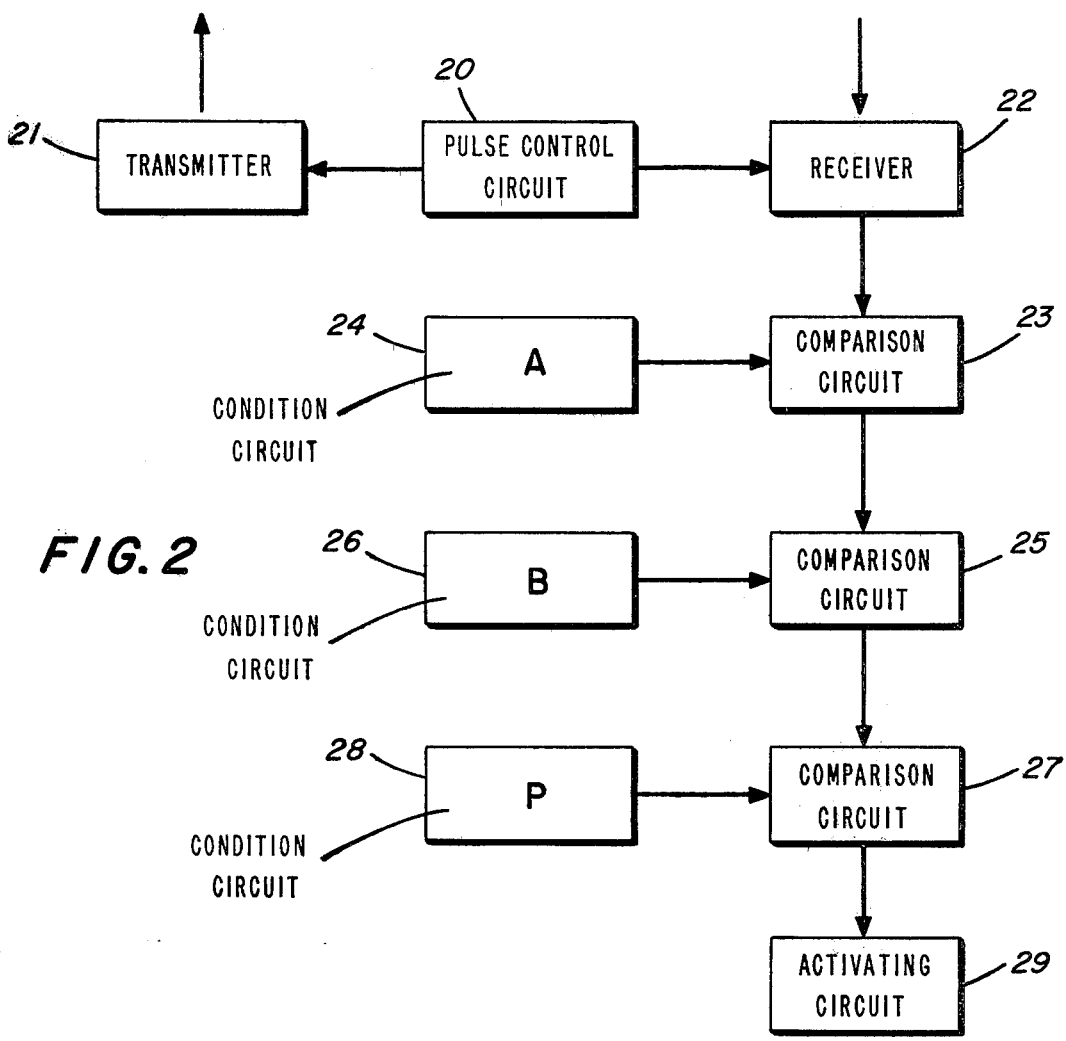
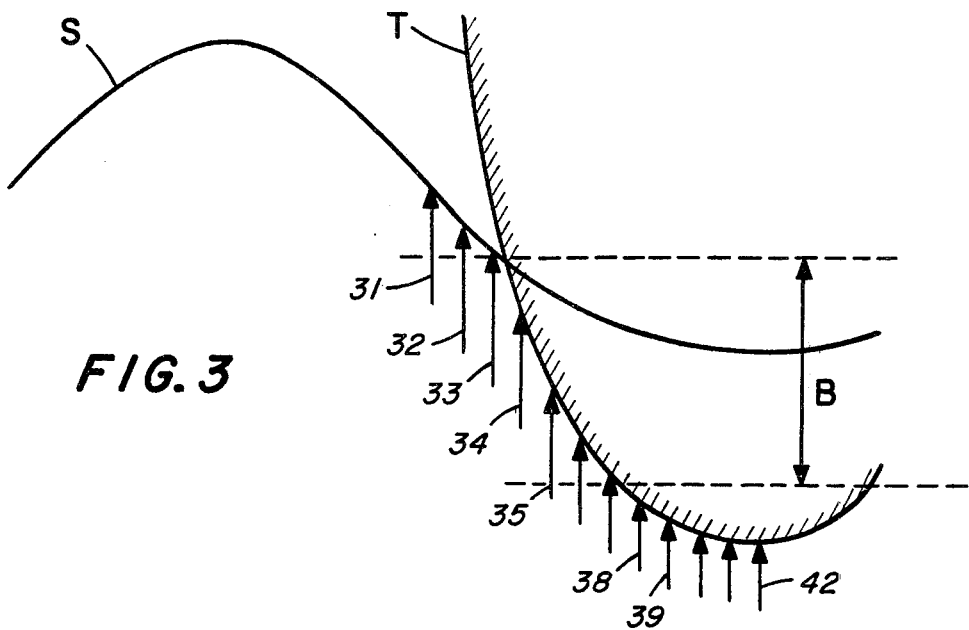

METHOD AND SYSTEM FOR DISTINGUISHING BETWEEN DISPLACING TARGETS AND A SURFACE OF WATER

This is a continuation-in-part of copending application Ser. No. 946,404, filed on Sept. 27, 1978, and assigned to the assignee of the present invention, and now abandoned.

BACKGROUND OF INVENTION

1. Field of Invention

This invention relates to a method and system for distinguishing between displacing targets and a surface of water by transmitting pulses from a transmitter towards the surface of water, the pulses being reflected and received by a receiver. The invention is intended to be used in a proximity fuse arrangement, for torpedoes or mines, for example.

2. Description of Prior Art

The previously known devices use the distance to the surface of the water as a reference, and form in different ways an average surface of the water in order to avoid the problem of false output functions when the sea is high. This leads to several disadvantages since it is very difficult with this method to fulfill the requirement for a low probability of error when the sea is heavy, and at the same time the requirement for a high probability of a correct function when passing the target. It is further required, in the prior art, that the ship's sides be almost vertical in order to get a correct and accurate function.

SUMMARY OF INVENTION

The invention is based on the fact that the inclination of the surface of the water is normally limited to a certain maximum angle, the size of which can be determined from measured wave spectra. If a larger inclination is measured, this is due either to an error in measurement or to the presence of an object in the water.

The invention is carried out in the following manner. From a transmitter, pulses (e.g., hydroacoustic pulses or laser pulses) are transmitted at constant intervals toward the surface of the water, where they are reflected and received by a receiver near the transmitter. The time from transmission to reception of the pulse is a measure of the distance to the reflecting object (the surface of the water or the ship).

The largest variation A in the distance to the surface of the water that can be expected in the absence of a target is predetermined by calculations and/or measurements. Distinction between the target and the surface of the water is, according to the invention, accomplished by giving the method the special characteristics disclosed below, and as is evident from the attached claims.

BRIEF DESCRIPTION OF DRAWINGS

Suitable embodiment of the method according to the invention will now be described with reference to the various figures of the drawings, of which:

FIG. 2 is a block diagram of the system of the present invention.

FIG. 3 is a diagram of a water wave S relative to a target T, utilized to further explain the method and system of the present invention.

DETAILED DESCRIPTION

Figure 1:
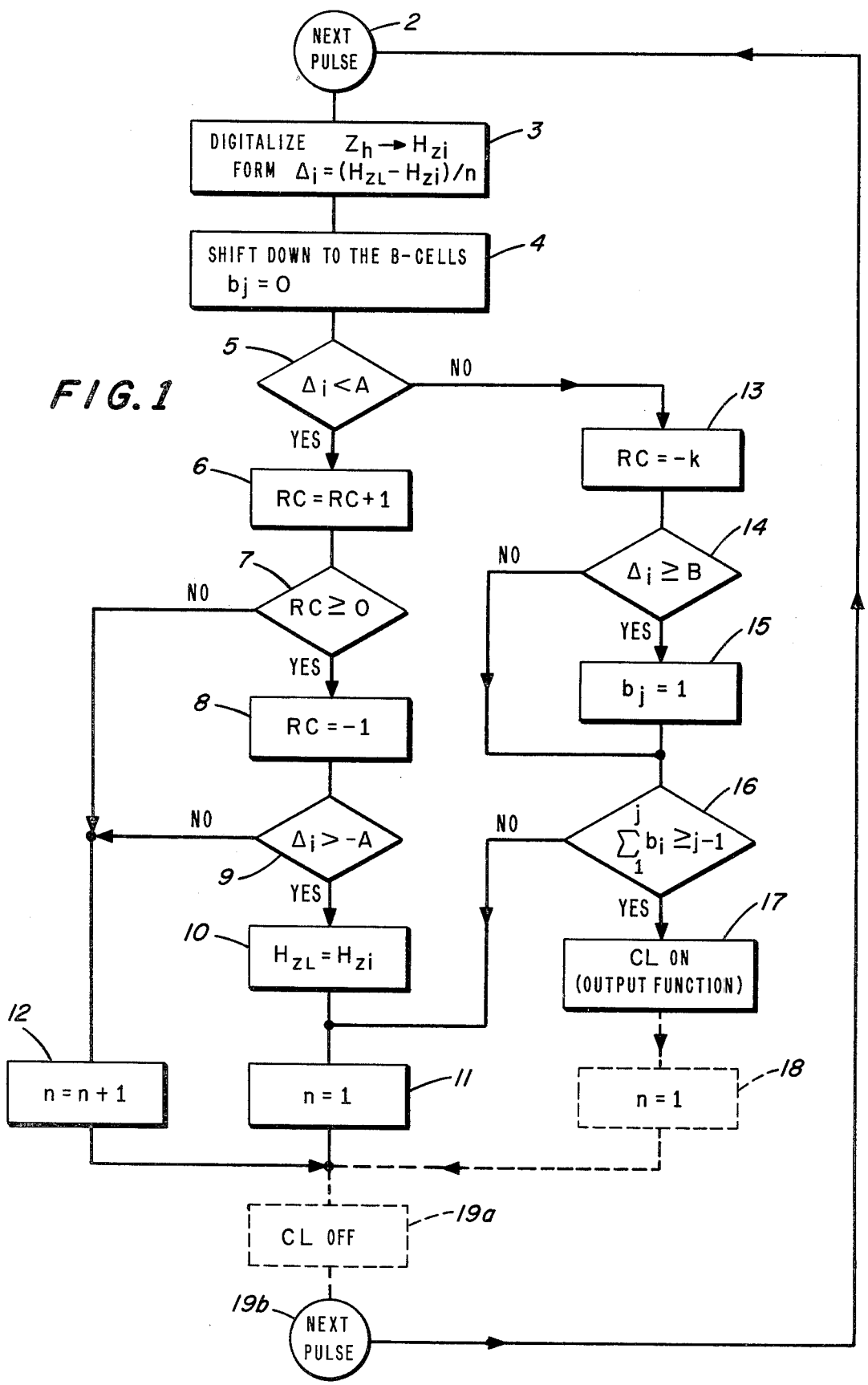
FIG. 1 is a flowchart of the various operations performed in accordance with the method of the present invention.

Referring to FIG. 1, the following symbols are used:

CL: output function
RC: counting cell
$Z_h$: measured distance
$H_{Zi}$: integer part of $Z_h/s$ where s is the factor of digitalization
$H_{ZL}$: previous accepted value of $H_{Zi}$
k: number of consecutive pulses with $|\Delta i| < A$ that is needed to reset $H_{ZL}$ to $H_{Zi-1}$ As explained above, pulses are transmitted at constant intervals toward the surface of the water where they are reflected and received by a receiver near the transmitter. The time from transmission to reception of the pulse is, accordingly, a measure of the distance to the reflecting object (typically, either the surface of the water or the surface of a target). The measured distances $Z_h$ are digitalized (block 3 of FIG. 1) to form digital value $H_{Zi}$. Then, in a conventional analyzer provided in the receiver, the value $$\Delta_i = \frac{H_{i-1} - H_{i-1+n}}{n} \text{ or } \frac{H_{Zi} - H_{ZL}}{n}$$

is formed, where $H_i$ is the distance to the reflecting surface for pulse number i, and $n-1$ is the number of times $\Delta_i$ has been rejected (block 3). As will be seen below, the value $\Delta_i$ will be rejected until the presence of a target is indicated.

Once the value $\Delta_i$ is formed, the shifting operation (block 4) relative to the B-cells is performed. It is to be noted that the B-cells store pulses meeting the condition $\Delta_i \geq B$.

$\Delta_i$ is then compared with a first determined value A (block 5). If $\Delta_i$ is less than A, then one of two conditions is indicated: either $\Delta_i$ is equal to or less than $-A$ (indicating an obvious error); or the magnitude of $\Delta_i$ is less than A (indicating that the measured inclination is smaller than the largest expected inclination, and the pulse response must be from the surface).

In any event, returning to block 5, if $\Delta_i$ is less than A, the counting cell pointer RC is incremented (block 6). Then, if the counting cell pointer RC is less than 0, the n-count is incremented (block 12). On the other hand, if RC is equal to or greater than 0, RC is set to $-1$ (block 8). Then, a further decision is made (in block 9) between the previously mentioned two conditions. That is to say, if $\Delta_i$ is equal to or less than $-A$, indicating obvious error, the n-count is incremented (block 12); conversely, if $\Delta_i$ is greater than $-A$, indicating pulse response from the surface, the previous accepted value $H_{ZL}$ for measured distance is replaced by the present measured distance $H_{Zi}$ (block 10), and the n-count is set to 1 (block 11).

Returning to block 5, if $\Delta_i$ is equal to or greater than A, a target is indicated, and the counting cell pointer RC is set to $-k$ (k is defined above). Then, $\Delta_i$ is compared to a further predetermined value B (block 14), the value B being a measure that corresponds to a certain minimum draft of water for targets of interest. Specifically, it is required that $\Delta_i$ be equal to or greater than B. This condition must be satisfied in order not to get an output function as a result of detection of large fish, logs, or the like; in fact, in order to preclude such erroneous output functions, the latter condition must be satisfied a certain number of times in succession, depending on the size of the target, detection of which is desired.

Thus, returning to block 14, if $\Delta_i$ is equal to or greater than B, the B-cell counter $b_j$ is set to 1 (block 15). Then, referring to block 16, if the summation condition contained therein is not satisfied, the n-count is set to 1 (block 11); conversely, if the summation condition contained in block 16 is satisfied, an output function is provided (block 17).

In other words, the B-cells, which (as previously stated) store pulses satisfying the condition $\Delta_i$ equal to or greater than B, are (as also previously stated) initialized in block 4. Then, each time the condition "$\Delta_i$ equal to or greater than B" is met (block 14), a "1" is stored in the B-cell corresponding to that pulse (block 15). When a certain number of (e.g., two) consecutive pulses meets the condition of block 14, as determined by decision block 16, the output function is provided (block 17). If the condition of block 16 is not satisfied, as indicated by the "NO" exit therefrom, the procedure continues until the certain number of consecutive pulses meets the condition of block 16.

In the event of an error in measurement (or if the condition has been satisfied by, e.g., a log), another condition can be introduced saying that if $\overline{\Delta_i} + m$ during a certain number of (e.g., two) consecutive pulses is $\leq A$, a target is considered not to be present, and so one returns to calculate $\Delta_i$.

The above-described method has, in simulations, given very good results, and as well has provided good results against those targets that have sides that have large inclinations in relation to the vertical plane. The method of the invention can, of course, be realized in several ways, and is not limited only to hydroacoustic devices. It can be used with all devices wherein transmitted pulses are used to measure the distance to a reflecting surface.

Further referring to FIG. 1, it is to be noted that the dotted-line portion of FIG. 1 (blocks 18 and 19a) is intended for use of the procedure in exercise conditions, such dotted-line portion being deleted during the performance of mere exercises. Thus, during exercise conditions, after completion of the function of block 17 (provision of the output function), the n-count is set to 1 (block 18), and block 19a is executed. During battle-type situations, completion of the functions of blocks 11 and 12, respectively, results in immediate execution of block 19b.

Referring to FIGS. 2 and 3, the arrangement of the present invention comprises a pulse control circuit 20, a transmitter 21, a receiver 22, three comparison circuits 23, 25, 27, three condition circuits 24, 26, 28, and an activating circuit 29. The control circuit 20 starts transmitter 21 and prevents receiver 22 from getting any pulses directly from the transmitter 21. Pulses are sent from the transmitter 21 with a frequency of 50 kHz, mentioned as an example.

Echo pulses received by the receiver 22 are transmitted to the first comparison circuit 23. In this circuit, each successive distance to the water surface is calculated by virtue of the time difference between transmission of a pulse and reception of the echo pulse. Then, the difference in distance measured by pulses 31 and 32 in FIG. 3 is measured, curve S representing a water wave and curve T representing the side of a boat.

Condition circuit 24 stores a value A representing the maximum change attributed to a wave. This value is, thus, calculated beforehand and represents the maximum angle and, therewith, the maximum difference that can be expected in the special case where the arrangement is to be used. The difference in distances of pulses 31 and 32 is expected to be less than A but the difference in distances of pulses 33 and 34 is expected to be greater than A because pulse 34 is reflected from the boat side T.

After the pulse 34 is received, a signal is transmitted to the comparison circuit 25 which is then activated. Activation of circuit 25 indicates that a target has probably been found but it is not sure that the target is of the right size, that is, greater than a value decided beforehand. Distance values corresponding to the mentioned pulses 33 and 34 are also transmitted to the circuit 25, wherein pulse value 33 is stored, and the difference between the said two values is compared with a value B (see FIG. 3). Apparently, in FIG. 3, the difference is less than B. The next incoming pulse value 35, together with the pulse value 33, gives a new difference which is also less than B. The difference between pulse value 38 and pulse value 33 is greater than B, however, so that a signal is transmitted from circuit 25 to circuit 27.

Circuit 27 counts the number of differences which exceed the value B. When this number of differences is equal to a predetermined value P, a signal is transmitted to activating circuit 29, and this causes detonation.

Thus, three conditions must be fulfilled before a detonation is caused: (1) there must be something in the water that represents a greater angle than the calculated maximum wave angle of the sea per the value A; (2) immediately after this first condition is fulfilled, the difference between pulse value 33 and a following pulse value (not necessarily the next pulse value) must be greater than a predetermined value B (condition in depth); and (3) after this has happened, the examination of the second condition must be repeated a predetermined number of times P (condition in breadth).

Although FIG. 2 illustrates the inventive arrangement in terms of discrete circuits for the sake of simplicity, in practice, the arrangement may be manufactured utilizing semiconductor (integrated circuit) technology so as to, for example, form the discrete circuits on a single chip. Normally, the constants A, B and P each have one value in dependence on where a torpedo associated with the arrangement is to be used (detonated), and depending on the type of targets for which the torpedo is intended. For example, a torpedo intended to be used in the Baltic sea has an arrangement with a value A calculated in advance from the wave structure of this sea so that it corresponds to the maximum wave angle to be expected for this sea. However, it is of course possible to make the value A adjustable depending on the particular sea for which the arrangement is intended. This adjustment may be made with a control voltage, the amplitude of which can be changed with a rheostat. Then, this voltage is provided by circuit 24 to the comparison circuit 23, as explained above. In the same way, the circuits 26 and 28 may be made adjustable as to parameters B and P depending on the particular kind of targets.

While preferred forms and arrangements have been shown in illustrating the invention, it is to be clearly understood that various changes in detail and arrangement may be made without departing from the spirit and scope of this disclosure.

We claim:

1. A method for distinguishing between displacing targets and a surface of water showing undulations comprising the steps of:

transmitting, from a point under the surface of the water, pulses towards the surface of the water, which pulses are reflected by the surface of the water;

receiving the reflected pulses;

measuring the wave spectra of said undulations so as to determine a chosen maximum angle of the inclination of the surface of the water from the wave spectra;

determining from said chosen angle the largest variation in the distance from the transmitter to the surface of the water that can be expected in the absence of said target;

measuring variations in the distance to the reflecting surface for consecutive pulses;

comparing said variations in the distance to the reflecting surface with said largest variation;

determining that said displacing target is present when said step of comparing said variations in the distance to the reflecting surface with said largest variation proves that said measured variations in the distance are equal to or exceed said determined largest variation;

comparing said variations in the distance to the reflecting surface with a determined value related to depth of the target; and determining that said displacing target is sufficient in depth when said step of comparing said variations in the distance to said reflecting surface with said determined value proves that said target is of sufficient depth.

2. A method as defined in claim 1, comprising the steps of comparing said variations in the distance to the reflecting surface with the negative of said determined largest variation, and determining that said variation in the distance comprises an erroneous measurement when said variation in the distance is equal to or less than the negative of said determined largest variation.

3. Arrangement for detecting objects in a body of water extending to at least a predetermined distance from the water surface, comprising:

transmitter means for transmitting successive pulses toward the water surface to obtain echo pulses therefrom;

receiver means for receiving said echo pulses and measuring the distances to the water surface for each successive said pulse received;

first comparison circuit means connected to the receiver means for comparing the apparent change in the distance to the water surface between said successive pulses with a first predetermined value representing the maximum change attributable to a wave;

second comparison circuit means connected to said first comparison circuit means for comparing, when the said apparent change in the distance to the water surface between successive pulses is greater than said first predetermined value indicating a target, an apparent difference between the distance to the water surface as measured for an earlier pulse and the distance to the target, with a second predetermined value representing a desired depth of targets;

third comparison circuit means connected to the second comparison circuit means for counting, when said apparent difference is greater than the said second predetermined value, the number of times the apparent differences for successive pulses exceeds said second predetermined value, and for comparing said counted number with a third predetermined value; and an activating circuit connected to the third comparison circuit means, said activating circuit being activated when the counted number exceeds said third predetermined value.

* * * * *